(12) United States Patent
Lu et al.

(10) Patent No.: US 10,466,520 B2
(45) Date of Patent: Nov. 5, 2019

(54) DIRECT-BONDING LIQUID CRYSTAL DISPLAY MODULE AND ASSEMBLY PROCESS THEREOF

(71) Applicant: Opton (Shunchang) Optics Co., LTD, Fujian (CN)

(72) Inventors: Zhang Lu, Fujian (CN); Qiming Yu, Fujian (CN); Zhangxiang Wu, Fujian (CN)

(*) Notice: Subject to any disclaimer, the term of this patent is extended or adjusted under 35 U.S.C. 154(b) by 0 days.

(21) Appl. No.: 16/082,280

(22) PCT Filed: Apr. 25, 2017

(86) PCT No.: PCT/CN2017/081862
§ 371 (c)(1),
(2) Date: Sep. 5, 2018

(87) PCT Pub. No.: WO2018/120538
PCT Pub. Date: Jul. 5, 2018

(65) Prior Publication Data
US 2019/0101786 A1    Apr. 4, 2019

(30) Foreign Application Priority Data
Dec. 31, 2016 (CN) .......................... 2016 1 1268540

(51) Int. Cl.
*G02F 1/1333* (2006.01)
*G02F 1/1335* (2006.01)
*G02F 1/01* (2006.01)

(52) U.S. Cl.
CPC ...... *G02F 1/133308* (2013.01); *G02F 1/0107* (2013.01); *G02F 1/13338* (2013.01);
(Continued)

(58) Field of Classification Search
CPC ........... G02F 1/133308; G02F 1/13338; G02F 1/133608; G02F 1/133602
See application file for complete search history.

(56) References Cited

U.S. PATENT DOCUMENTS

2014/0362328 A1* 12/2014 Kuroki .............. G02F 1/133308
349/58
2015/0168767 A1* 6/2015 Yonemura ......... G02F 1/133308
349/58
(Continued)

FOREIGN PATENT DOCUMENTS

CN    102566808 A    7/2012
CN    102736278 A    10/2012
(Continued)

*Primary Examiner* — James A Dudek
(74) *Attorney, Agent, or Firm* — Prakash Nama; Global IP Services, PLLC (57) ABSTRACT

A direct-bonding liquid crystal display module, comprising a liquid crystal panel protection layer (1), a liquid crystal panel (2), and a backlight module (3). The liquid crystal panel protection layer (1) is bonded to the front side of the liquid crystal panel (2). The backlight module (3) is mounted on the back side of the liquid crystal panel (2). A housing support (5) is provided at the side surface of the backlight module (3) at an interval. The front side of the housing support (5) is provided with a positioning groove (51). The liquid crystal panel protection layer (1) is embedded in the positioning groove (51) and is fixedly connected thereto. The housing support (5) is fastened and connected to the back side (34) of the backlight module (3) by means of a fastener (6).

10 Claims, 5 Drawing Sheets

(52) U.S. Cl.
CPC ............ *G02F 1/133602* (2013.01); *G02F 2001/133311* (2013.01); *G02F 2001/133322* (2013.01); *G02F 2001/133325* (2013.01); *G02F 2001/133331* (2013.01)

(56) References Cited

U.S. PATENT DOCUMENTS

2017/0038515 A1* 2/2017 Yuki ............... G02B 6/0036
2018/0203553 A1* 7/2018 Li ................... G06F 3/0412

FOREIGN PATENT DOCUMENTS

| CN | 104364835 A | 2/2015 |
| CN | 206321906 U | 7/2017 |

* cited by examiner

DIRECT-BONDING LIQUID CRYSTAL DISPLAY MODULE AND ASSEMBLY PROCESS THEREOF

BACKGROUND OF THE INVENTION

The present invention relates to the technical field of graphic display equipment, and more specifically relates to a full-laminated LCD module and a method for assembly the same.

Figure 1:
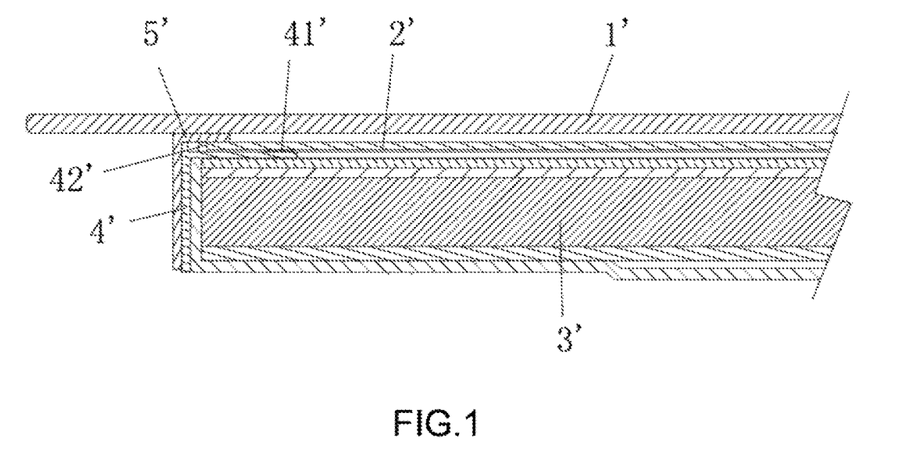
FIG. 1 is a schematic structural view of one side of a conventional LCD module according to prior art.
Figure 2:
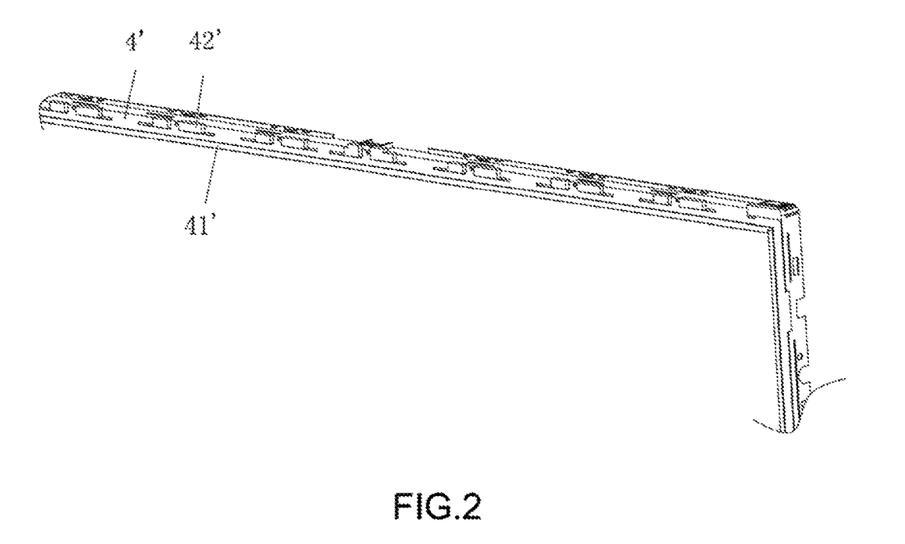
FIG. 2 is a schematic structural view of a supporting rack of the conventional LCD module according to prior art.

A conventional LCD module is schematically illustrated in FIGS. 1-2. The conventional LCD module as shown comprises a protective layer 1' (a screen protective glass or a touch screen), a liquid crystal panel 2' and a backlight module 3', wherein a supporting rack 4' that clamps and fix the position of the backlight module 3' is provided around a surface of the backlight module 3'. The liquid crystal panel 2' is positioned on the supporting rack 4'. To prevent breakage of the liquid crystal panel 2' when the liquid crystal panel 2' is fixed and tightened to the supporting rack 4', a first buffer gasket 41' is provided at a contact surface between the supporting rack 4' and the liquid crystal panel 2'. Platforms 42' that limit the lateral movement of the liquid crystal panel 2' are provided around the supporting rack 4'. Positioning press bars 5' that limit the vertical movement of the liquid crystal panel 2' are provided on the platforms 42'. The protective layer 1' is mounted on the front surfaces of the positioning press bars 5'. To prevent breakage of the liquid crystal panel 2' when it is fixed and tightened to the positioning press bars 5', second buffer gaskets 51' are provided at the contact surface between the positioning press bars 5' and the liquid crystal panel 2'.

In a conventional LCD module, the supporting rack 4' and its first buffer gasket 41' form a gap between the liquid crystal panel 2' and the backlight module 3'. The platforms 42', the positioning press bars 5' and the second buffer gaskets 51' form a gap between the liquid crystal panel and the protective layer. The liquid crystal panel and the protective layer are usually made of glass, and glass is subject to warping during processing. The larger the screen being made, the greater the screen will warp. Warping of a screen having a size of 84 inches can be as great as 5-8 mm. To prevent downgraded image quality or impact against the liquid crystal panel causing breakage of the liquid crystal panel when the liquid crystal panel touches the backlight module during installation due to its warpage and also its own weight, the platforms are formed with greater heights, thereby creating even a larger gap. The gap results in light loss which reduce image clarity. Also, the greater the gap is, the greater the light loss will be. Further, a greater gap means limitation of the viewing angle of the LCD module, and vapor condensed in the gap will blur the back surface of the liquid crystal panel and the surface of the backlight module and develop molds thereon. On the other hand, the clamping structure formed by the supporting rack and the positioning press bars will cause uneven light reflection of edge lights and light distortion at the clamped area and unclamped area, thereby resulting in dots of light leakage at the edge portions of edge lights.

CN 102566808A discloses a touch display device, in which positioning press bars are not used. The touch sensor protective layer is directly adhered to the front surface of the liquid crystal panel. Although the resulting full-laminated touch display device eliminates the gap between the touch sensor element and the liquid crystal display module and thus reduces light loss, the touch sensor element of the disclosed touch display device is still fixed on the platforms of a rear shell. Since the liquid crystal panel and the touch sensor element are adhered together, omitting the positioning press bars further enlarges the gap between the liquid crystal panel and the backlight module. Further, there is a tolerance for displacement between the liquid crystal panel and the protective layer after they are adhered together. When the protective layer having a larger size in the full-laminated screen is inserted and fixed into the fixing slots of an outer frame, it is also required to position and fix the liquid crystal panel which has a smaller size in the full-laminated screen into the slots of the backlight module at the same time under a condition that the four edges of the liquid crystal panel are not visible during installation. This step of positioning both the protective layer and the liquid crystal panel at the same time plus the aforementioned tolerance are very likely to result in impact of the fragile liquid crystal panel during installation that will break the liquid crystal panel. Accordingly, the yield rate is very low according to the currently available installation procedure of a full-laminated touch display module, thereby increasing the manufacturing cost.

BRIEF SUMMARY OF THE INVENTION

It is an object of the present invention is to provide a full-laminated LCD module that is easy to assemble.

The object is achieved as follows: A full-laminated LCD module, comprising a protective layer, a liquid crystal panel and a backlight module; the protective layer is adhered to a front surface of the liquid crystal panel; the backlight module is installed at a back side of the liquid crystal panel; an outer supporting frame is provided around the backlight module; a front surface of the outer supporting frame is opened with a positioning slot; the protective layer is embedded in and fixedly connected to the positioning slot; the outer supporting frame and a back surface of the backlight module are tightly connected by using tightening elements.

A liquid crystal panel supporting frame is fixedly mounted at four sides of a front surface of the backlight module; the liquid crystal panel is positioned at a front surface of the liquid crystal panel supporting frame; a buffer gasket is provided at a contact surface between the liquid crystal panel supporting frame and the liquid crystal panel.

The protective layer is a screen protective glass or a touch screen module.

Strengthening ribs are also provided at interior sides of the outer supporting frame.

The outer supporting frame has a frame structure.

The tightening elements are capable of adjusting a distance between the liquid crystal panel and the backlight module.

The tightening elements comprise gaskets and screws; the screws that tightly connect the outer supporting frame and the gaskets are spring screws; the distance between the liquid crystal panel and the backlight module is adjusted by how tight the spring screws are screwed. Compared with the use of ordinary screws which cannot be adjusted with respect to how tight they are screwed, the present invention can increase the yield rate of installation. Also, an optimal wide viewing angle can be obtained since the distance between the liquid crystal panel and the backlight module can be adjusted.

The full-laminated LCD module as disclosed above has some breakthroughs in that the outer supporting frame is directly disposed at the sides of the backlight module, and the protective layer adhered with the liquid crystal panel is embedded in the positioning slot of the outer supporting frame. As such, the present invention does not require the conventional supporting frame which has platforms. By positioning the liquid crystal panel directly on the front surface of the backlight module so as to be smoothly adhered with the front surface of the backlight module, the liquid crystal panel is prevented from any possibility of impacting any frame, thereby overcoming the disadvantage of the prior art during installation. Product yield rate as a result of successful installation is significantly increased compared with conventional LCD module. Specifically, the product yield rate is increased from 50% up to above 98%. Accordingly, production cost is reduced, and the procedure of processing a full-laminated LCD module is simplified. Moreover, a wider viewing angle can be resulted in the full-laminated LCD module of the present invention made by smooth adhesion between the liquid crystal panel and the backlight module.

Another object of the present invention is to provide a method for assembling the above described full-laminated LCD module.

This object is achieved as follows: A method for assembling the full-laminated LCD module, comprising the following steps:

1. adhering the protective layer to a front surface of the liquid crystal panel to form an integral screen;

2. embedding the protective layer into the positioning slot of the outer supporting frame, and fixedly connecting the protective layer with the positioning slot;

3. flipping over the outer supporting frame and positioning the backlight module into a space formed by the outer supporting frame and the integral screen 10;

4. connecting a back side of the backlight module and the outer supporting frame tightly by using tightening elements.

Further, when the liquid crystal panel supporting frame is fixedly mounted at four sides of the front surface of the backlight module, step 3 also comprises: connecting the liquid crystal panel supporting frame and the backlight module; flipping over the outer supporting frame and positioning the backlight module into a space formed by the outer supporting frame and the integral screen;

The object of providing a method for assembling the above described full-laminated LCD module can be alternatively achieved as follows: A method for assembling the full-laminated LCD module, comprising the following steps:

1. adhering the protective layer to a front surface of the liquid crystal panel to form an integral screen;

2. connecting a back side of a back panel of the backlight module and the outer supporting frame tightly by using tightening elements to form an integral body;

3. embedding the protective layer into the positioning slot of the outer supporting frame, and fixedly connecting the protective layer with the positioning slot.

Further, when the liquid crystal panel supporting frame is fixedly mounted at four sides of the front surface of the backlight module, step 2 also comprises: connecting a back side of the back panel of the backlight module and the outer supporting frame tightly by using tightening elements to form an integral body, and then connecting the liquid crystal panel supporting frame and the front surface of the backlight module.

The method of assembling the full-laminated LCD module as disclosed by the present invention is not limited to the prior art method in which the integral screen is first subject to positioning before being fixed. According to the present invention, the liquid crystal panel is positioned on a surface of the backlight module that faces to the liquid crystal panel, and the protective layer adhered with the liquid crystal panel is embedded into a positioning slot of the outer supporting frame. According to this structure of the present invention, the integral screen and the backlight module can be assembled and adjusted separately according to practical need. The cost and difficulty of replacing failed parts during repair and maintenance are also reduced. Thus, the present invention overcomes the shortcomings of conventional installation procedure, and provides easy installation and increased installation efficiency.

DETAILED DESCRIPTION OF THE INVENTION

The preferred embodiments of the present invention will be described in detail below with reference to the accompanying drawings.

Embodiment 1

Figure 3:
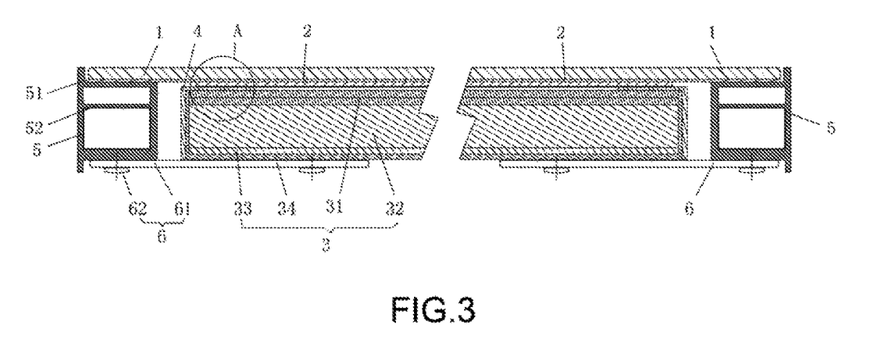
FIG. 3 is a schematic structural view of the full-laminated LCD module according to embodiment 1 of the present invention.
Figure 4:
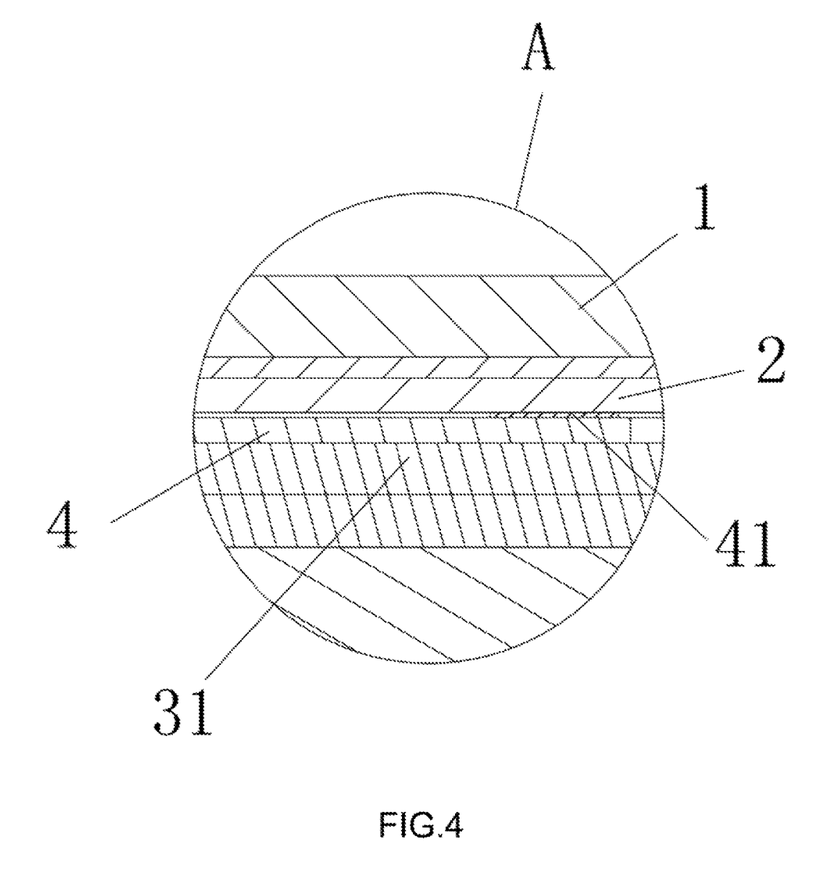
FIG. 4 is an enlarged view of portion A shown in FIG. 3.
Figure 5:
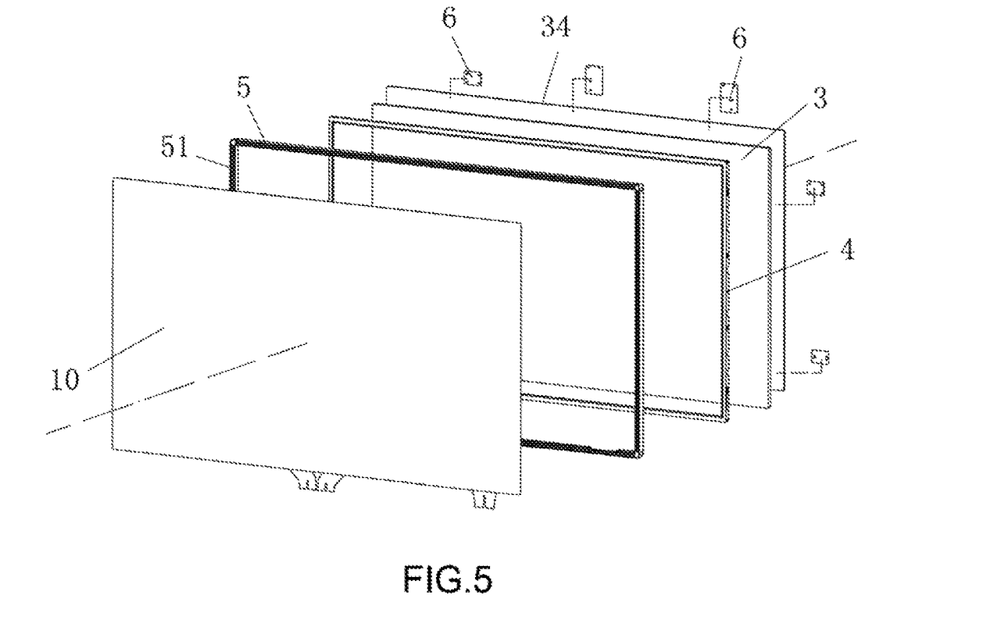
FIG. 5 is an exploded view showing the structure of the full-laminated LCD module according to embodiment 1 of the present invention.

As shown in FIGS. 3-5, a full-laminated LCD module comprises a protective layer 1, a liquid crystal panel 2 and a backlight module 3; the protective layer 1 is adhered to a front surface of the liquid crystal panel 2; the backlight module 3 is installed at a back side of the liquid crystal panel 2; a liquid crystal panel supporting frame 4 is fixedly mounted at four sides of a front surface of the backlight module 3; a surface of the liquid crystal panel supporting frame 4 that faces towards the liquid crystal panel 2 is provided with a buffer gasket 41; the liquid crystal panel 2 is positioned on a front surface of the buffer gasket 41; an outer supporting frame 5 is provided around the liquid crystal panel supporting frame 4 and spaced apart from peripheral sides of the liquid crystal panel supporting frame 4; a front surface of the outer supporting frame 5 is opened with a positioning slot 51; strengthening ribs 52 are also provided at interior sides of the outer supporting frame 5; the protective layer 1 is embedded in and fixedly connected to the positioning slot 51; the outer supporting frame 5 and a back panel 34 of the backlight module 3 are tightly connected by using tightening elements 6; the tightening elements 6 comprise gaskets 61 and screws 62.

A method for assembling the full-laminated LCD module according to embodiment 1 comprises the following steps:

1. Adhering the protective layer 1 to a front surface of the liquid crystal panel 2 to form an integral screen 10;

2. embedding the protective layer 1 into the positioning slot 51 of the outer supporting frame 5, and fixedly connecting the protective layer 1 with the positioning slot 51;

3. connecting the liquid crystal panel supporting frame 4 and the backlight module; flipping over the outer supporting frame 5 and positioning the backlight module 3 into a space formed by the outer supporting frame 5 and the integral screen 10;

4. connecting a back side of the backlight module 3 and the outer supporting frame 5 tightly by using several tightening elements 6.

Another method for assembling the full-laminated LCD module according to embodiment 1 comprises the following steps:

1. Adhering the protective layer 1 to a front surface of the liquid crystal panel 2 to form an integral screen 10;

2. connecting a back side of the backlight module 3 and the outer supporting frame 5 tightly by using tightening elements 6 to form an integral body, and then connecting the liquid crystal panel supporting frame 4 and the backlight module 3:

3. embedding the protective layer 1 into the positioning slot 51 of the outer supporting frame 5, and fixedly connecting the protective layer 1 with the positioning slot 51.

Embodiment 2

Figure 6:
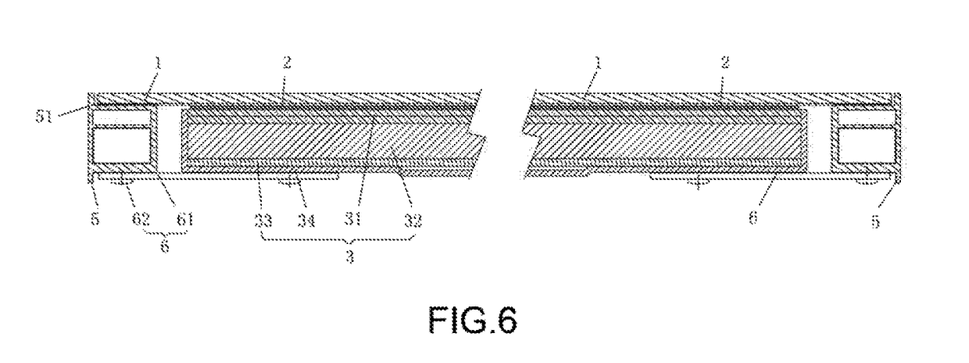
FIG. 6 is a schematic structural view of the full-laminated LCD module according to embodiment 2 of the present invention.
Figure 7:
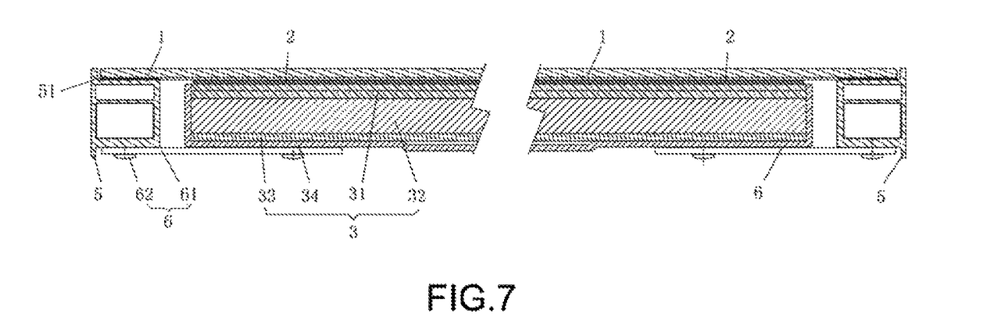
FIG. 7 is an assembled view showing the structure of the full-laminated LCD module according to embodiment 2 of the present invention.
Figure 8:
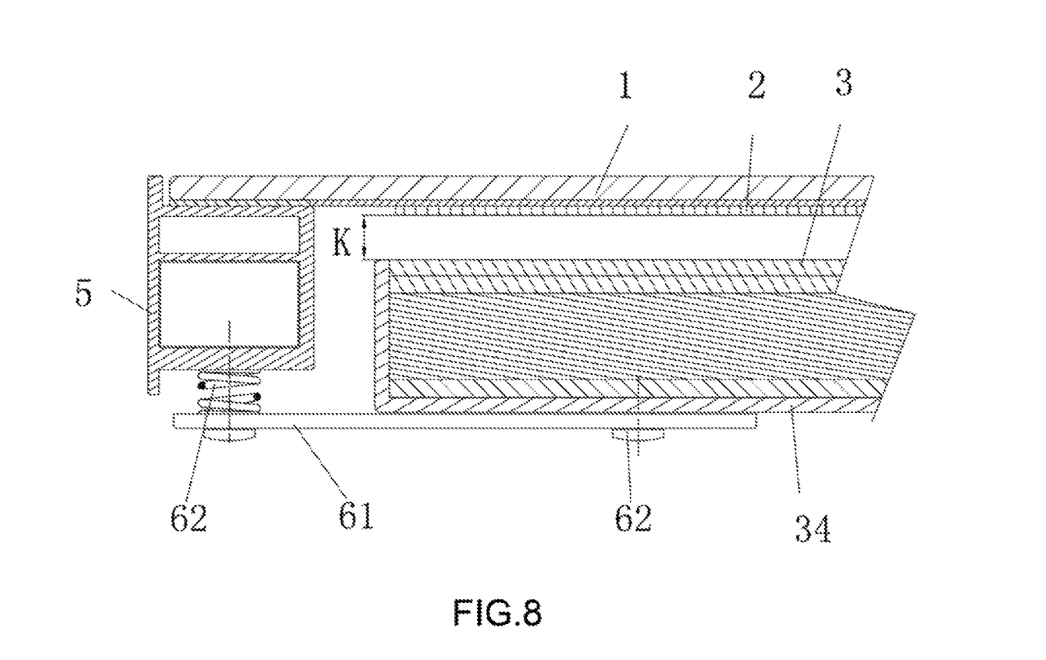
FIG. 8 is a partial structural view of the full-laminated LCD module according to embodiment 2 of the present invention when a spring screw is used for tightening.

As shown in FIGS. 6-8, a full-laminated LCD module comprises a protective layer 1, a liquid crystal panel 2 and a backlight module 3; the protective layer 1 is adhered to a front surface of the liquid crystal panel 2; the backlight module 3 is installed at a back side of the liquid crystal panel 2; an outer supporting frame 5 is provided around the backlight module 3 and spaced apart from peripheral sides of the backlight module 3; a front surface of the outer supporting frame 5 is opened with a positioning slot 51; the protective layer 1 is embedded in and fixedly connected to the positioning slot 51; the outer supporting frame 5 and a back panel 34 of the backlight module 3 are tightly connected by using tightening elements 6; the tightening elements 6 comprise gaskets 61 and screws 62; the screws 62 that tightly connect the outer supporting frame 5 and the gaskets 61 are spring screws.

A method for assembling the full-laminated LCD module according to embodiment 2 comprises the following steps:

1. Adhering the protective layer 1 to a front surface of the liquid crystal panel 2 to form an integral screen 10;

2. embedding the protective layer 1 into the positioning slot 51 of the outer supporting frame 5, and fixedly connecting the protective layer 1 with the positioning slot 51;

3. flipping over the outer supporting frame 5 and positioning the backlight module 3 into a space formed by the outer supporting frame 5 and the integral screen 10;

4. connecting a back side of the backlight module 3 and the outer supporting frame 5 tightly by using tightening elements 6.

Another method for assembling the full-laminated LCD module according to embodiment 2 comprises the following steps:

1. Adhering the protective layer 1 to a front surface of the liquid crystal panel 2 to form an integral screen 10;

2. connecting a back side of the backlight module 3 and the outer supporting frame 5 tightly by using tightening elements 6 to form an integral body;

3. embedding the protective layer 1 into the positioning slot 51 of the outer supporting frame 5, and fixedly connecting the protective layer 1 with the positioning slot 51.

Figure 9:
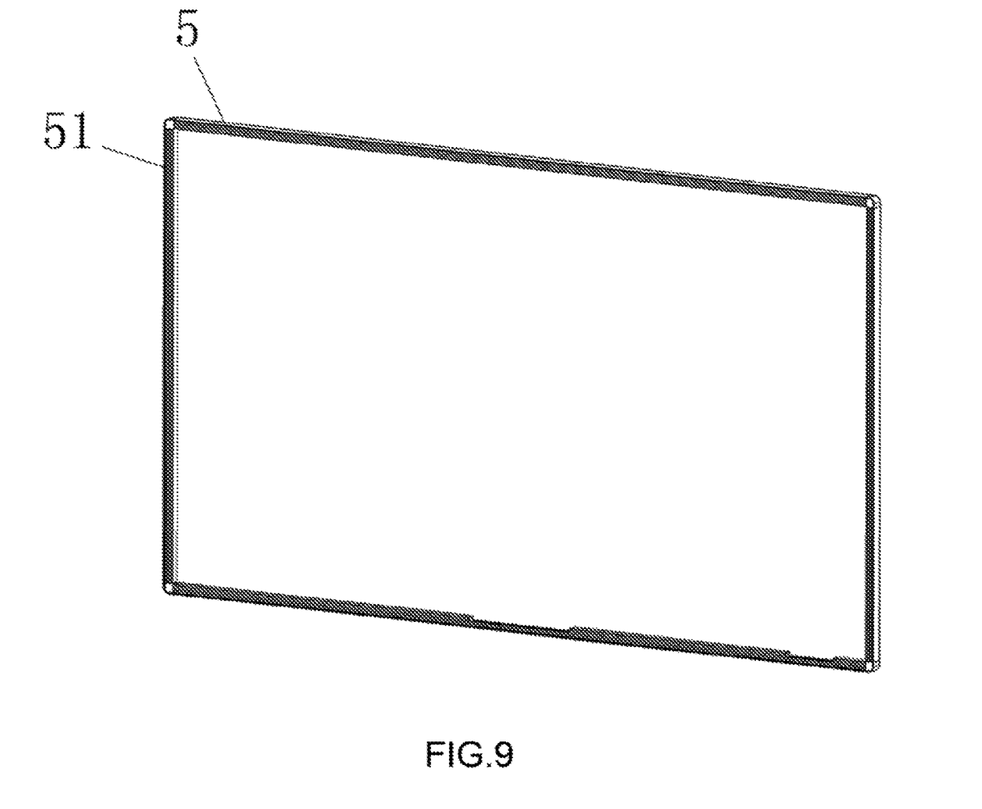
FIG. 9 is a schematic structural view of the outer supporting frame according to embodiments 1 and 2 of the present invention.

The protective layer of the full-laminated LCD module is a touch screen in the above embodiments. In actual production, a screen protective glass may also be used in accordance with practical need. The protective layer can be adhered to and fixed with the liquid crystal panel by using optical adhesives; the liquid crystal panel and the outer supporting frame can be fixed by using foam adhesives; the tightening elements are elements such as gaskets normally used for installing a display device, and thus will not be described in detail herein. In the embodiments, the outer supporting frame is a frame structure, and more specifically an ordinary rectangular frame (as shown in FIG. 9). In actual production, the frame structure can be altered in accordance with practical need, provided that any altered structure can still support the protective layer. In the embodiments, the backlight module 3 normally comprises a brightening film 31, a light guiding panel 32 and a reflection film 33. However, the backlight module 3 should not be limited to the described structure. As shown in FIG. 7, the outer supporting frame 5 and the gaskets 61 are fixed and connected via spring screws. A distance K between the liquid crystal panel 2 and the backlight module 3 is adjusted by how tight the spring screws are screwed. Compared with the use of ordinary screws which cannot be adjusted with respect to how tight they are screwed, the present invention can increase the yield rate of installation. Also, an optimal wide viewing angle can be obtained since the distance between the liquid crystal panel and the backlight module can be adjusted. It should be noted that the structures of the tightening elements should not be limited to gaskets and spring screws as shown in the embodiments, provided that any other structures can still achieve adjustment of the distance between the liquid crystal panel and the backlight module. For example, replacement of different screws of different sizes can also achieve distance adjustment. Alternatively, a Z-shaped locking component can also be used to achieve the same purpose.

The above description only illustrates some embodiments of the present invention, and should not be considered limiting the scope of the present invention. Any alternative configurations that achieve the same effect based on the teachings of the description of the present invention, or applications of the present invention directly or indirectly in other related technical field should fall within the scope of protection of the present invention.

What is claimed is:

1. A full-laminated LCD module, comprising a protective layer, a liquid crystal panel and a backlight module; wherein the protective layer is adhered to a front surface of the liquid crystal panel to form an integral screen; the backlight module is installed at a back side of the liquid crystal panel; an outer supporting frame is provided around the backlight module and spaced apart from the backlight module; a front surface of the outer supporting frame is opened with a positioning slot; the protective layer is embedded in and fixedly connected to the positioning slot; the liquid crystal panel is positioned directly on a front surface of the backlight module and spaced apart from touching the outer supporting frame; the outer supporting frame and a back surface of the backlight module are tightly connected by using tightening elements; the tightening elements are capable of adjusting a distance between the liquid crystal panel and the backlight module.

2. The full-laminated LCD module of claim 1, wherein a liquid crystal panel supporting frame is fixedly mounted at four sides of the front surface of the backlight module; the liquid crystal panel is positioned at a front surface of the liquid crystal panel supporting frame; a buffer gasket is provided at a contact surface between the liquid crystal panel supporting frame and the liquid crystal panel.

3. The full-laminated LCD module of claim 1, wherein the protective layer is a screen protective glass or a touch screen module.

4. The full-laminated LCD module of claim 1, wherein strengthening ribs are provided at interior sides of the outer supporting frame.

5. The full-laminated LCD module of claim 1, wherein the outer supporting frame has a frame structure.

6. The full-laminated LCD module of claim 1, wherein the tightening elements comprise gaskets and screws; the screws that tightly connect the outer supporting frame and the gaskets are spring screws.

7. A method for assembling a full-laminated LCD module comprising a protective layer, a liquid crystal panel and a backlight module; the protective layer is adhered to a front surface of the liquid crystal panel to form an integral screen; the backlight module is installed at a back side of the liquid crystal panel; an outer supporting frame is provided around the backlight module and spaced apart from the backlight module; a front surface of the outer supporting frame is opened with a positioning slot; the protective layer is embedded in and fixedly connected to the positioning slot; the liquid crystal panel is positioned directly on a front surface of the backlight module and spaced apart from touching the outer supporting frame, the outer supporting frame and a back surface of the backlight module are tightly connected by using tightening elements; the tightening elements are capable of adjusting a distance between the liquid crystal panel and the backlight module; the method comprising the following steps:
1. adhering the protective layer to the front surface of the liquid crystal panel to form the integral screen;
2. embedding the protective layer into the positioning slot of the outer supporting frame, and fixedly connecting the protective layer with the positioning slot;
3. flipping over the outer supporting frame and positioning the backlight module into space formed by the outer supporting frame and the integral screen;
4. connecting a back side of a back panel of the backlight module and the outer supporting frame tightly by using the tightening elements.

8. A method for assembling a full-laminated LCD module comprising a protective layer, a liquid crystal panel and a backlight module; the protective layer is adhered to a front surface of the liquid crystal panel to form an integral screen; the backlight module is installed at a back side of the liquid crystal panel; an outer supporting frame is provided around the backlight module and spaced apart from the backlight module; a front surface of the outer supporting frame is opened with a positioning slot; the protective layer is embedded in and fixedly connected to the positioning slot; the liquid crystal panel is positioned directly on a front surface of the backlight module and spaced apart from touching the outer supporting frame; the outer supporting frame and a back surface of the backlight module are tightly connected by using tightening elements; the tightening elements are capable of adjusting a distance between the liquid crystal panel and the backlight module; the method comprising the following steps:
1. adhering the protective layer to the front surface of the liquid crystal panel to form the integral screen;
2. connecting a back side of a back panel of the backlight module and the outer supporting frame tightly by using the tightening elements to form an integral body;
3. embedding the protective layer into the positioning slot of the outer supporting frame, and fixedly connecting the protective layer with the positioning slot.

9. A method for assembling a full-laminated LCD module comprising a protective layer, a liquid crystal panel and a backlight module, the protective layer is adhered to a front surface of the liquid crystal panel to form an integral screen; the backlight module is installed at a back side of the liquid crystal panel; an outer supporting frame is provided around the backlight module and spaced apart from the backlight module; a front surface of the outer supporting frame is opened with a positioning slot; the protective layer is embedded in and fixedly connected to the positioning slot; the liquid crystal panel is positioned directly on a front surface of the backlight module and spaced apart from touching the outer supporting frame; the outer supporting frame and a back surface of the backlight module are tightly connected by using tightening elements; the tightening elements are ca able of adjusting a distance between the liquid crystal panel and the backlight module; a liquid crystal panel supporting frame is fixedly mounted at four sides of the front surface of the backlight module; the liquid crystal panel is positioned at a front surface of the liquid crystal panel supporting frame; a buffer gasket is provided at a contact surface between the liquid crystal panel supporting frame and the liquid crystal panel; the method comprising the following steps:
1. adhering the protective layer to the front surface of the liquid crystal panel to form the integral screen;
2. embedding the protective layer into the positioning slot of the outer supporting frame, and fixedly connecting the protective layer with the positioning slot;
3. connecting the liquid crystal panel supporting frame and the backlight module, and then flipping over the outer supporting frame, and positioning the backlight module into a space formed by the outer supporting frame and the integral screen, wherein the liquid crystal panel contacts the buffer gasket;
4. connecting a back side of a back panel of the backlight module and the outer supporting frame tightly by using the tightening elements.

10. A method for assembling a full-laminated LCD module comprising a protective layer, a liquid crystal panel and a backlight module; the protective layer is adhered to a front surface of the liquid crystal panel to form an integral screen; the backlight module is installed at a back side of the liquid crystal panel; an outer supporting frame is provided around the backlight module and spaced apart from the backlight module; a front surface of the outer supporting frame is opened with a positioning slot; the protective layer is embedded in and fixedly connected to the positioning slot; the liquid crystal panel is positioned directly on a front surface of the backlight module and spaced apart from touching the outer supporting frame; the outer supporting frame and a back surface of the backlight module are tightly connected by using tightening elements; the tightening elements are capable of adjusting a distance between the liquid crystal panel and the backlight module; a liquid crystal panel supporting frame is fixedly mounted at four sides of the front surface of the backlight module; the liquid crystal panel is positioned at a front surface of the liquid crystal panel supporting frame; a buffer gasket is provided at a contact surface between the liquid crystal panel supporting frame and the liquid crystal panel; the method comprising the following steps:

1. adhering the protective layer to the front surface of the liquid crystal panel to form the integral screen
2. connecting a back side of a back panel of the backlight module and the outer supporting frame tightly by using the tightening elements to form an integral body, and connecting the liquid crystal panel supporting frame to the front surface of the backlight module;
3. embedding the protective layer into the positioning slot of the outer supporting frame, and fixedly connecting the protective layer with the positioning slot.

* * * * *